United States Patent [19]

Siegel et al.

[11] Patent Number: 4,714,927
[45] Date of Patent: Dec. 22, 1987

[54] PULSE DOPPLER RADAR WITH VARIABLE PULSE REPETITION RATE

[75] Inventors: Harald Siegel, Gauting; Rudolf Hauptmann, Dachau, both of Fed. Rep. of Germany

[73] Assignee: Siemens Aktiengesellschaft, Berlin and Munich, Fed. Rep. of Germany

[21] Appl. No.: 617,510

[22] Filed: Jun. 5, 1984

[30] Foreign Application Priority Data

Jun. 13, 1983 [DE] Fed. Rep. of Germany ....... 3321263

[51] Int. Cl.$^4$ ............... G01S 13/52; G01S 13/54
[52] U.S. Cl. ........................... 342/160; 342/163
[58] Field of Search ............ 343/17.1, 7.7, 7 A, 343/17.1 PF; 342/159, 160, 93, 163, 162

[56] References Cited

U.S. PATENT DOCUMENTS 3,828,348  8/1974  Murray, Jr. ................. 343/7.7 X
4,214,242  7/1980  Colin ............................ 343/7.7

FOREIGN PATENT DOCUMENTS 3110279  1/1984  Fed. Rep. of Germany .

OTHER PUBLICATIONS

Skolnik, M. I., Introduction to Radar Systems, 1980, p. 118, McGraw-Hill, Inc.
Introduction to Radar Systems, Skolnik, Merrill I., 1980, pp. 121–123, McGraw Hill.
Skolnik, "Introduction to Radar Systems", (1962), pp. 129–133.

Primary Examiner—T. H. Tubbesing
Assistant Examiner—Mark Hellner
Attorney, Agent, or Firm—Hill, Van Santen, Steadman & Simpson

[57] ABSTRACT

A pulse doppler radar having variable repetition rates, noise pulses resulting from echos received from stationary multiple-time-around objects are removed by subjecting the reflected pulses to a coherent integration modified by means of a simplified vectorial addition of the reflected pulses, using an integration circuit consisting of a plurality of filters. The signal amplitude produced at the output of each filter is individually compared to the mean value of signals produced by all other filters, and a target indication is produced when the mean value is exceeded by the amplitude of a signal from an individual filter.

7 Claims, 7 Drawing Figures

PULSE DOPPLER RADAR WITH VARIABLE PULSE REPETITION RATE

BACKGROUND

1. Field of the Invention

The present invention relates to a pulse doppler radar system with variable pulse repetition rate, and especially to such a system having an arrangement for cancelling permanent echos and for integrating the reflected pulses.

2. The Prior Art

Various systems have been developed for ranging, moving and fixed targets using doppler radar, and such systems which have fixed pulse repetition rates are adapted to processing unwanted multiple-time-around echos.

When a pulse doppler radar system is employed with periodic switching of the pulse repetition rate, using a doppler filter to furnish a moving target indication, the cancellation of permanent echos from multiple-time-around ranges deteriorates. Whereas fixed echos from the unambiguous range are returned unaltered at various pulse repetition rates, the permanent echos from multiple-time-around ranges fall into different ranges, so that the permanent echo amplitude usually changes in every range. Accordingly, the basis for cancelling permanent echos in the doppler filter is lost, and the varying amplitude permanent signals can no longer be discriminated from moving target echos signals, and can only partially be cancelled by the doppler filter.

Due to the change of the pulse repetition rate from pulse to pulse (sometimes referred to as staggering), the echos of individual pulses, or noise signals that simulate reflected target pulses from multiple-time-around ranges fall into different range gates, or individual ranges. Therefore, the single pulses falling into the several range gates cannot be integrated. The probability of detection of such pulses is considerably reduced in the presence of superimposed noise. When an extensive clutter region extends over several ranges, the clutter corresponds to signals representing a plurality of distance ranges for the radar system, and then the probability that a plurality of target echos from a plurality of multiple-time-around ranges will accumulate within the same range gate rises considerably. In this case, permanent echos that derive from multiple-time-around targets can lead to erroneous operation.

As described in a German patent DE OS 3,110,279, it is known to stagger the pulse repetition rate such that at least two different pulse repetition rates are transmitted during the target sweep time. Targets from multiple-time-around ranges are distinguished from those in the unambiguous range because the echo signals from each individual pulse repetition fall into a different range gate. As a result, the permanent echos supply fewer signals to be integrated in accord with the number of pulse repetition rates employed and are attenuated in comparison to signals from the unambiguous range of the radar system. Since every switchover of the pulse repetition rate leads to transients in the moving target filter, which transients result in changes in the amplitude of permanent echos and thus disrupt the moving target indication, the first reception periods after each changeover of the pulse repetition radar are blanked out. Without a noticeable loss of sensitivity, this type of staggering of the pulse repetition rate is particularly suitable for radar installations that have a high number of reflected signals during the target sweeptime. Because of cost consideration, the integration of the echo signals does not usually take place in a coherent fashion. Circuits which integrate the echo signals after they are received are relatively inexpensive but do not achieve an optimum effect.

Accordingly, it is desirable to provide a system with pulse doppler radar of the type having periodic switching of the pulse repetition rate in which deterioration of the moving target indication is prevented.

BRIEF DESCRIPTION OF THE INVENTION

It is a principal object of the present invention to provide an apparatus and method for allowing pulse doppler radar of the type periodically switching the pulse repetition rate to prevent deterioration of the indication of a moving target because of pulses received as multiple-time-around echoes.

This object is achieved in the present invention by subjecting the echo signals to a coherent integration in an integration circuit comprising of plurality of filters, such integration being modified by means of simplified vectorial addition of the doppler signal pulses. The signal amplitudes obtained at the output of each filter are individually compared to the mean value of the video signals of all other filters, and manifested as a target indication in accordance with the result of the comparison.

The present invention allows multiple-time-around echo signals to be discriminated on a spectral basis from moving targets of the unambiguous range, with a small number of filters. The present invention also guarantees an optimum detection of moving targets from the unambiguous range in the presence of strong multiple-time-around clutter due to the modified coherent integration, since the echo signals of a range gate are vectorially added over a plurality of reception periods. The mean power of the multiple-time-around echos is distributed over a plurality of range gates as a result of the spectral staggering of the pulse repetition rate. The modified coherent integration enables the entire doppler frequency range of interest to be covered with a small number of filters and to statistically combine the different pulse periods.

In accordance with a further development of the invention, the advantages of coherent integration are also obtained in the case of the appearance of a single pulse, when the integration circuit is preceeded by a circuit for cancelling single pulses.

DESCRIPTION OF THE DRAWINGS

Reference will now be made to the accompanying drawings in which.

DESCRIPTION OF THE PREFERRED EMBODIMENT

Figure 1:
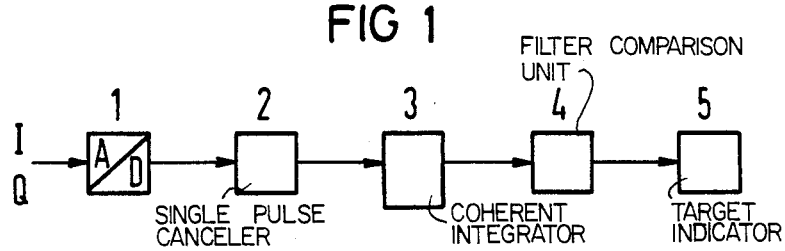
FIG. 1 is a functional block diagram of the signal processing branch of a pulse doppler radar incorporating vectorial integration.

Referring to FIG. 1, a functional block diagram of a digital processing system incorporating the present invention is illustrated. An analog to digital converter 1 is supplied at its input side with video signals from the I channel and from the Q channel by a phase detector (not shown). The analog to digital converter A/D unit 1 produces digital signals at its output which are supplied to a number of stages connected in cascade. The stages consists of EZPU circuit 2 for single pulse cancellation, an integration KOH-INT circuit 3, a filter comparison FV circuit 4, and a ZA target indicator 5. Since single pulses which are produced either as noise or from unrelated radar installations can represent multiple-time-around echos and seriously complicate a target acquisition, the single pulse cancellation unit 2 is employed for removing such single pulses. By this means detection of a moving target can be significantly improved in a environment with much noise. Since circuits for a single pulse cancellation are known, it is not necessary to describe the circuit 2 in detail herein.

The integration unit 3 performs a modified coherent integration of the echo signals. It considerably reduces the complexity of the filters which would be required for a coherent integration in a pulse doppler radar with variable pulse repetition rate. The only requirements for execution of the modified coherent integration consists in the use of a specific staggering of the pulse repetition rate, and of a phase backing of the signal voltages that has a constant value. When these conditions are met, nearly optimum target detection is provided. The echo signals of a range gate are vectorially added over a plurality of reception periods, and multiple-time-around clutter is largely cancelled by recognizing that the mean power of the multiple-time-around echos is distributed over a plurality of range gates. The desired effect can be achieved by means of a specific staggering of the pulse repetition rate, and when the pulse repetition periods are statistically combined, a large number of coherent filters is required when applying a coherent integration in order to cover the entire doppler frequency range of interest. Using the modified coherent integration according to the present invention, a substantially simpler and more economical construction results, by which multiple-time-around echos can be discriminated from the moving targets of the unambiguous range using a small number of filters. The discrimination itself takes place by means of a filter comparison performed in the circuit stage 4. Due to the noise character of multiple-time-around echos, they are greatly attenuated in power as a result of the narrow bandwidth of the coherent filters. In contrast to the moving targets within the unambiguous range, the multiple-time-around echos are transmitted in all of the filters.

In order to discriminate reflected pulses from the unambiguous range from reflected pulses resulting from the multiple-time-around ranges, the amplitude of the output voltage of each filter is compared to the mean value of amplitudes of all neighboring filters. As a result of this comparison, a target signal is furnished to the unit 5 only when the output signal of an individual filter has an amplitude that is a prescribed factor greater than the measured mean value of all other filters.

Figure 2:
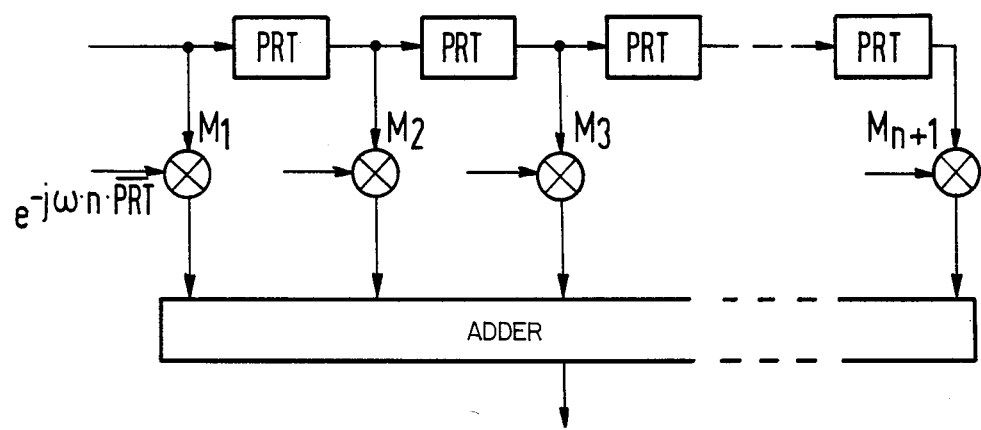
FIG. 2 is a functional block diagram of a circuit for modified vectorial integration of the echo signals.

FIG. 2 shows a block diagram of the filter unit 3. Digital signals are supplied from its input to a shift register $SR_1$. A series of such shift registers are connected in cascade, with the last shift register being designated $SR_n$. There is one shift register provided for each of the signal values to be integrated, and they each supply a delay which corresponds to the pulse repetition period of the radar. The output of each shift register is connected to the input of an individual multiplier $M_1$ through $M_{n+1}$. The output of each multiplier is connected to inputs of a common adder AD. The adder AD adds the products of all of the multipliers $M_1-M_{n+1}$ to arrive at a sum which is proportional to the mean value of all of the products.

In order to perform vectorial addition of the samples with coherent integration, a phase backing of the individual samples is necessary. This must normally be derived from the momentary pulse repetition rate and the filter frequency. In the case of the modified coherent integration of FIG. 2, all samples at the outputs of the shift registers are subjected to a weighting in their respective multipliers of a factor $e^{-j \cdot \omega_o \cdot n \cdot \overline{PRT}}$. This operation brings about a constant phase baking so that the required phase condition for the vectorial addition is restored. In the weighting factor, $\omega_o$ is $2\pi$ times the center filter frequency, n is the number of samples, and $\overline{PRT}$ is a mean period duration of the pulse repetition rate.

Figure 3:
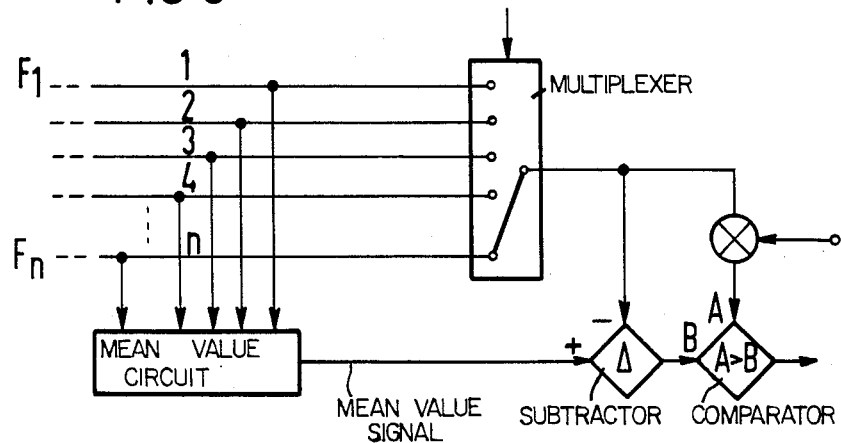
FIG. 3 is a functional block diagram of a circuit for implementing filter comparison.

The discrimination of multiple-time-around echos from moving targets is explained in greater detail referring to FIG. 3 which is a block diagram of the circuit 4 of FIG. 1. The signal values at the output $F_1$ through $F_n$ of all of the filters is supplied to a circuit MS which forms the mean value, and whose output signal GMW is supplied to a subtractor SS for further evaluation. All filter outputs $F_1$ through $F_n$ are successfully sampled by means of a selection switch WS, and as a result multiple-time-around signals are furnished to the selection switch WS. At any position of the selection switch, one filter output is supplied as an upper end to the subtractor unit SS. In this way the mean value GMW of the output signals of all filters is changed into a mean value of the output signals of all filters other than the sampled one, which in the illustration of FIG. 3 is the filter $F_n$. Thus, the output of subtractor SS is the mean value of all filters $F_1$ through $F_{1-n}$, forming a new mean value B. The new mean value B is compared in amplitude to the filter output signal A from the filter $F_n$, which output has been weighted by means of the multiplier MW and supplied as the A input to the comparator KS. When a comparator KS determines that A is larger than B, such that the weighted value of the signal from the filter $F_n$ exceeds the mean value of signals from all of the filters, an output is produced from the comparator KS which is employed in the unit 5 to indicate a target. If A is less than B, no output signal is produced so that the signal is suppressed.

In order to obtain a comb filter structure in the integration circuit for the case of a quasi-statistical pulse repetiton frequency, the staggering of the pulse repetition times must be selected such that the sum of two successive pulse repetition times produces a value which is constant for all pairs of successive pulses. The comb structure becomes more regular if the staggering takes place in a more ordered fashion. A pronounced comb structure is produced when the $n^{th}$ transmission pulse follows the first transmitted pulse within an integration interval after $(\overline{PRT}+(-1)^n \cdot \Delta t)$, where $\overline{PRT}$ is a constant period duration and $\Delta T$ is a constant fraction of this period.

Figure 4:
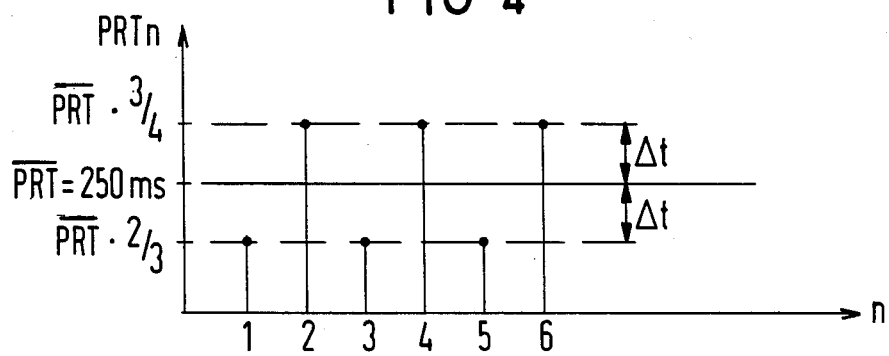
FIGS. 4 and 5 are diagrammatic illustrations showing the staggering of the pulse repetition rate.
Figure 5:
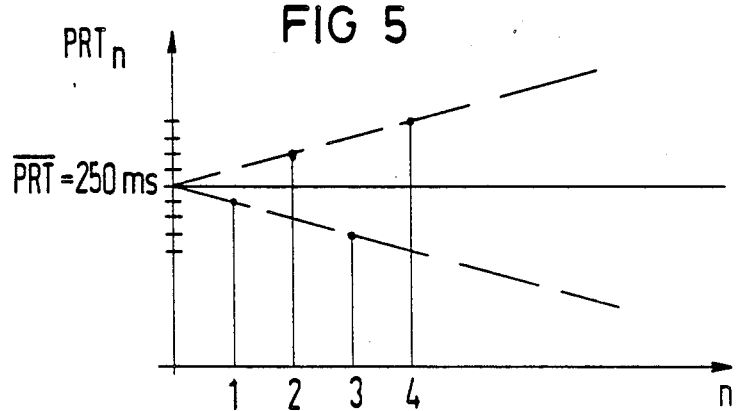

Two examples of a possible staggering arrangement are illustrated in FIGS. 4 and 5. Both examples are based on a mean pulse repetition rate $\overline{PRF}=4$ kHz having a corresponding pulse repetition time $\overline{PRT}$ of 250 μs. As illustrated in FIG. 4, the period of successive pulses alternates between the values $\frac{2}{3}\cdot\overline{PRT}$ and $4/3\cdot\overline{PRT}$. The mean value of any two successive pulse repetition periods is a constant value, namely 250 μs. Such a pulse repetition rate staggering is defined according to the equation $$PRT_n = \overline{(PRT} + (-1)^n \cdot \Delta T).$$

In the example of FIG. 4, $\Delta T = \frac{1}{3}\overline{PRT}.$

Figure 6:
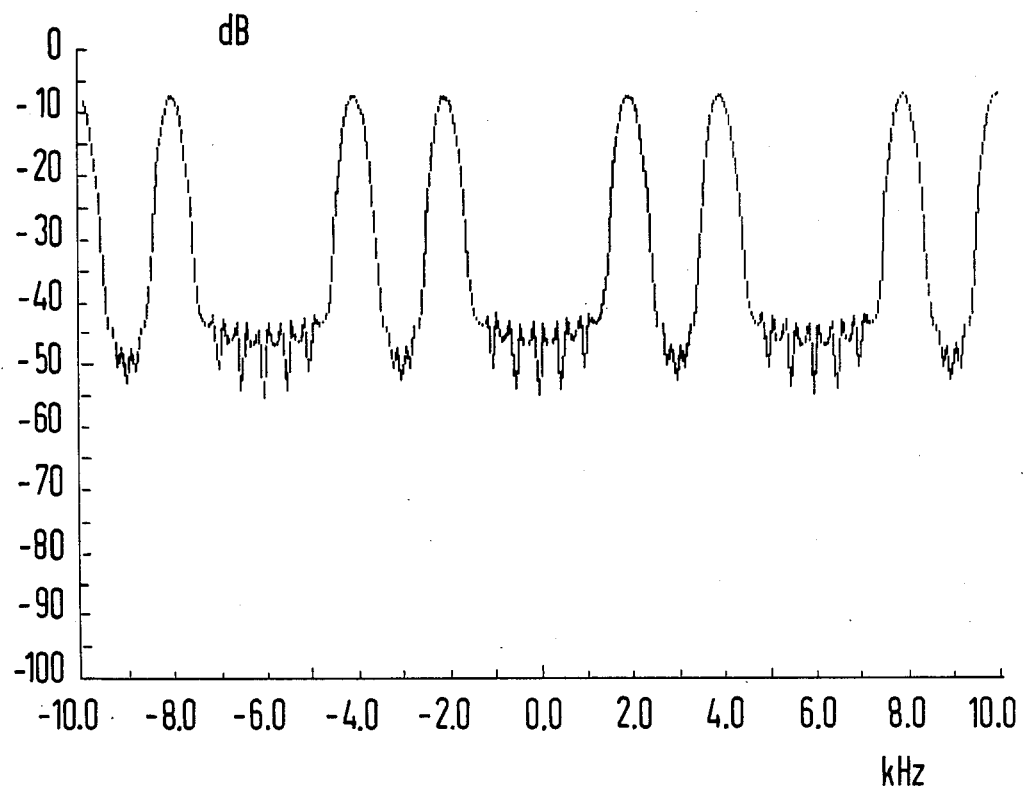
FIGS. 6 and 7 are graphs illustrating transfer of functions of the integration circuit for two different staggerings of the pulse repetition rate.

FIG. 6 shows the transfer function of a modified coherent integration in accordance with the present invention of 16 pulses in accordance with the staggering of FIG. 4. The phase backing of the signal values as the constant value $\Delta\phi = 2\pi \cdot f_o \cdot \overline{PRT}$, in which $f_o$ is the center of filter frequency and is equal to 2 kHz. The comb structure resulting from the modified coherent integration is clearly shown in the transfer function of FIG. 6. An important feature of this transfer function is that the frequency range around the doppler frequency 0 lies in the stop band, so that only moving targets result and signals pass through to the target indicator 5.

In FIG. 5, a second example of the staggering of the pulse repetition rate is shown. It is based on the same pulse repetition period PRT = 250 μs. This staggering of the pulse repetition rate of FIG. 5 is formed according to the equation $$PRT_n = \overline{(PRT} + n \cdot (-1)^n \cdot \Delta T).$$

The number of different pulse repetition frequencies which may be employed in accordance with this equation is not restricted to two different frequencies, but can assume any large value. The essential feature of the staggering is that any two successive repetition periods have a constant mean value.

Figure 7:
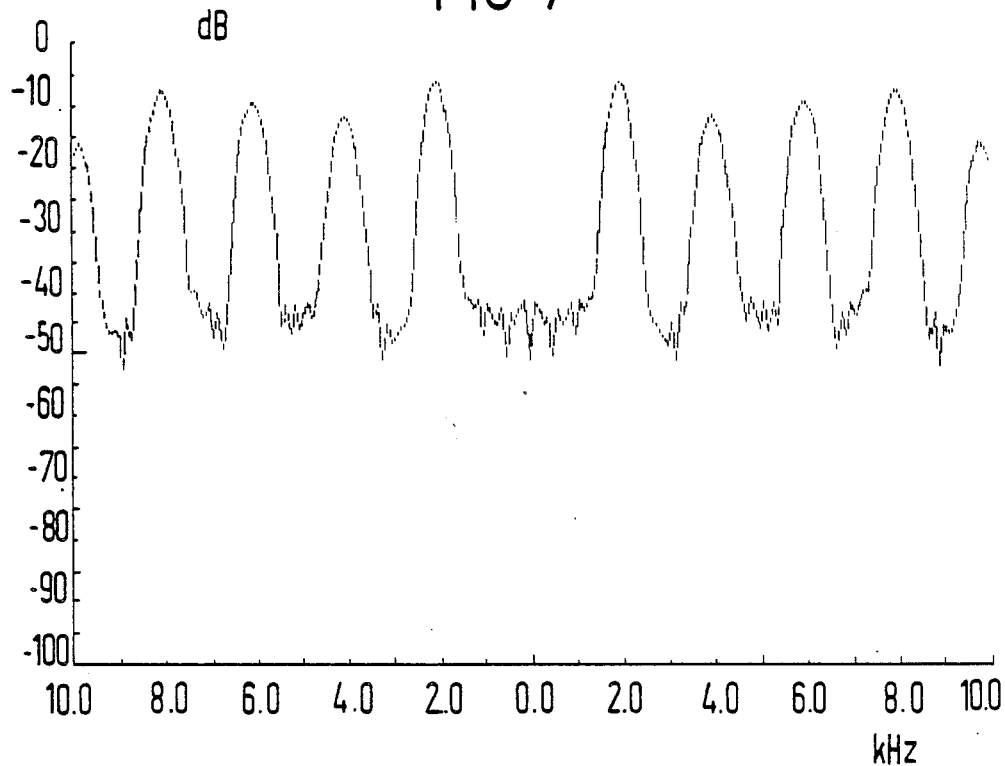

FIG. 7 shows the transfer function obtained with the coherent integration of 16 pulses staggered in accordance with the example of FIG. 5. In this arrangement, $\Delta T$ is one $\frac{1}{3} \cdot 1/16 \cdot \overline{PRT}$. The constant phase backing necessary to the modified coherrent integration is again $\Delta\phi = 2 \cdot f_o \cdot \overline{PRT}$, whereby $f_o = 2$ kHz. The transfer function of FIG. 7 also shows the comb structure with a null in the region of the doppler frequency 0.

It is apparent that the arrangement of the present invention furnishes a simple and economical means of discriminating against over-the-horizon pulses which would interfere with the clear indication of a target within the unambiguous zone. Various modifications and additions may be made to the apparatus of the present invention without departing from the essential features of novelty thereof, which are intended to be defined and secured by the appended claims.

What is claimed is:

1. In a pulse doppler radar having a variable pulse repetition rate and means for cancelling permanent echos and for integrating reflected pulses, the improvement comprising a plurality of frequency domain filters, comparator means connected to receiver outputs from said filters for comparing the output of each filter individually with the mean value of signals produced by all other filters, whereby reflected pulses received by said pulse dopler radar are subjected to a coherent integration modified by simplified vectorial addition of the pulses, and means connected to said comparator means for supplying a signal representing a target indication in response to the output of said comparator, said target indicating signal adapted for direct connection to a target indicator for producing a target display.

2. Apparatus according to claim 1 including means for staggering the pulse repetition rates such that the sum of the periods of successive pairs of pulses has a constant value, and means for establishing a constant phase backing of the reflected pulses so that the phase deviation after every second pulse repetition rate is equal to 0.

3. Apparatus according to either claim 2 or claim 2 including a single pulse cancellation circuit connected between a source of reflected pulses and the inputs to said plurality of filters.

4. A method of cancelling noise signals in a doppler radar system having a variable pulse repetition rate and having means for cancelling permanent echoes and for integrating reflected pulses, comprising the steps of modifying signal pulses received by said radar system by subjecting them to coherent integration with vectorial addition of the doppler signal pulses, by providing a plurality of frequency domain filters and individually comparing the output obtained at each filter with the mean value of signals obtained from all other filters, and producing a target indication in response to the result of such comparison, said target indication being adapted for direct connection to a target indicator for producing a target display.

5. The method according to claim 4 including the step of staggering the pulse repetition rates of said pulse doppler radar so that the sum of the periods of successive pairs of pulse repetition rates has a constant value, and employing a constant phase backing for the reflected pulses such that the phase deviation after every second pulse repetition rate is equal to 0.

6. The method according to claim 5 including the step of cancelling single pulses from the signals which are subjected to said coherent integration.

7. Apparatus according to claim 2, wherein said means for staggering the pulse repetition rates is operative to stagger said rates according to the equation $PRT_n = \overline{PRT} + n \cdot (-1)^n \cdot \Delta T,$ where $\overline{PRT}$ is a constant period duration and $\Delta T$ is a constant fraction of said constant period duration.

* * * * *